United States Patent [19]

Schulten et al.

[11] 4,274,938
[45] Jun. 23, 1981

[54] APPARATUS FOR THE PRODUCTION OF HYDROGEN AND OXYGEN

[75] Inventors: Rudolf Schulten, Aachen-Richterich; Friedrich Behr, Herzogenrath-Kohlscheid; Helmut Wenzl, J lich, all of Fed. Rep. of Germany

[73] Assignee: Kernforschungsanlage Jülich GmbH, Jülich, Fed. Rep. of Germany

[21] Appl. No.: 97,968

[22] Filed: Nov. 28, 1979

Related U.S. Application Data

[62] Division of Ser. No. 12,746, Feb. 16, 1979, Pat. No. 4,235,863.

[30] Foreign Application Priority Data

Feb. 18, 1978 [DE] Fed. Rep. of Germany ....... 2806984

[51] Int. Cl.³ .................... C25B 15/08; C25C 3/02; C25B 9/00; C25B 13/04
[52] U.S. Cl. .................................. 204/239; 204/247; 204/262; 204/266; 204/295
[58] Field of Search ............... 204/129, 237, 263–266, 204/295, 243–247, 68, 262

[56] References Cited

U.S. PATENT DOCUMENTS

| 3,544,374 | 12/1970 | D'Alessandro et al. | 204/129 X |
| 3,620,942 | 11/1971 | Day et al. | 204/237 X |
| 3,796,647 | 3/1974 | Shalit | 204/129 X |
| 4,011,148 | 3/1977 | Goudal | 204/129 |

FOREIGN PATENT DOCUMENTS

| 1944967 | 3/1971 | Fed. Rep. of Germany | 204/129 |
| 46-5561 | 2/1971 | Japan | 204/129 |
| 51-52993 | 5/1976 | Japan | 204/129 |

*Primary Examiner*—Delbert E. Gantz
*Assistant Examiner*—D. R. Valentine
*Attorney, Agent, or Firm*—Karl F. Ross

[57] ABSTRACT

An apparatus for producing hydrogen and oxygen or oxides wherein electrolysis of an aqueous system is carried out using, in the cathode compartment of the electrolysis cell, a hydride-forming liquid metal, the resulting hydride being thermally decomposed to produce the hydrogen.

5 Claims, 1 Drawing Figure

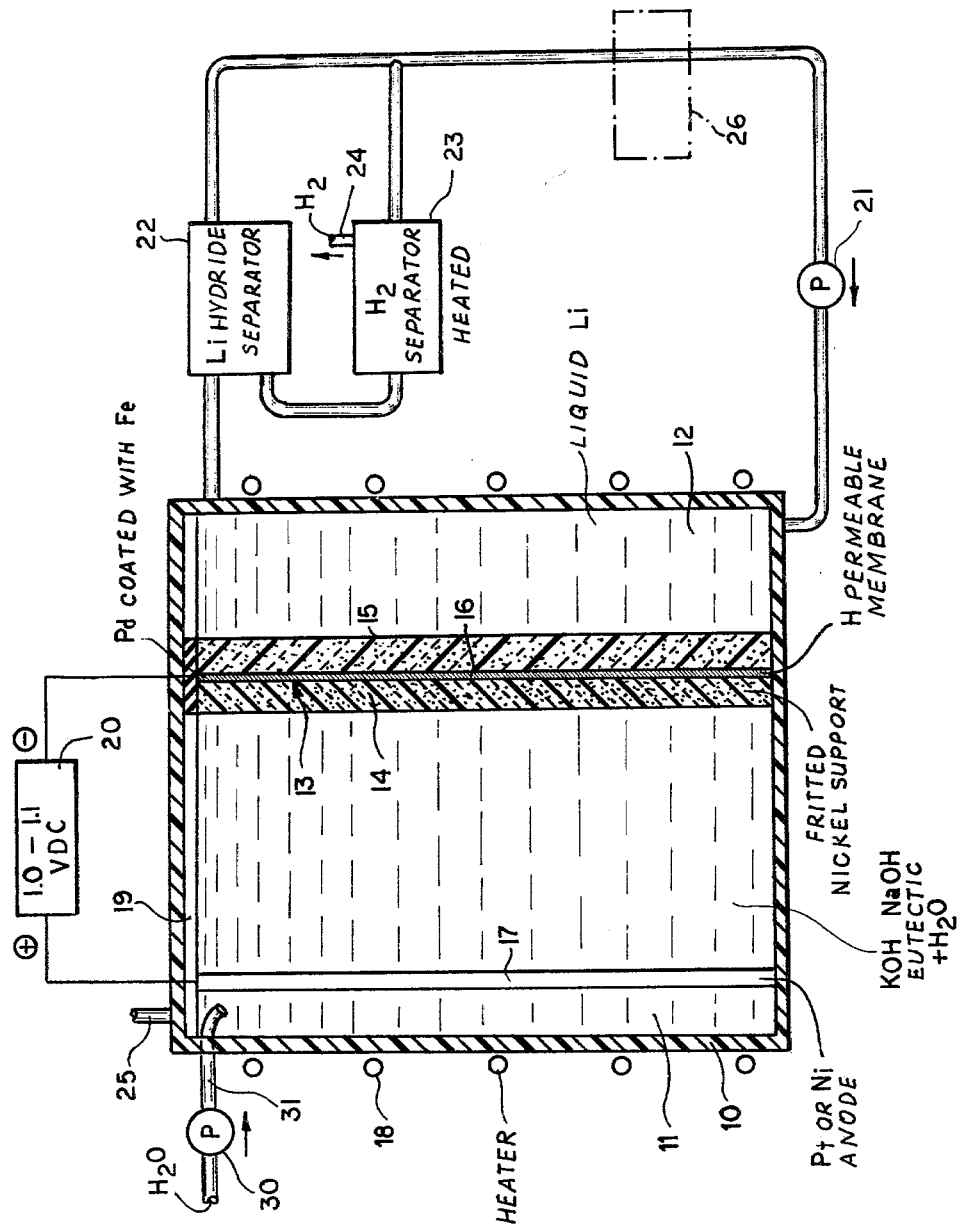

APPARATUS FOR THE PRODUCTION OF HYDROGEN AND OXYGEN

This is a division of application Ser. No. 012,746, filed Feb. 16, 1979 now U.S. Pat. No. 4,235,863.

FIELD OF THE INVENTION

The present invention relates to an apparatus for the production of hydrogen and oxygen and to the utilization therein of an electrolysis cell.

BACKGROUND OF THE INVENTION

It is known to generate hydrogen and oxygen by the use of electrical energy in an electrolysis process in which water or another substrate containing both hydrogen and oxygen is subjected to the electrolysis in an electrolysis cell, with or without the aid of further chemical reactions, to produce the hydrogen or oxygen or hydrogen and oxides which are generated instead of gaseous oxygen.

An electrolysis cell for this purpose is generally subdivided into an anode compartment and a cathode compartment by a membrane which is permeable to hydrogen.

The production of hydrogen and oxygen by electrolytic decomposition of water, for example, is a well known practice utilizing the above-mentioned approach.

It is known, in addition, to increase the efficiency of the electrolytic decomposition by a simultaneous chemical reaction which has the function of reducing the voltage required for the decomposition at the anode and hence the current requirements for the decomposition.

When a chemical reaction is to be effected simultaneously with the electrolysis for the purposes described, it is desirable, as much as possible, to provide a reversible chemical reaction so that a portion of the supplied energy is coupled with an endothermic chemical reaction.

For example, in the so-called sulfuric acid hybrid process, the sulfur dioxide is initially reacted anodically to sulfuric acid in accordance with the following equation:

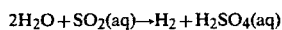
$$2H_2O + SO_2(aq) \rightarrow H_2 + H_2SO_4(aq)$$

The sulfuric acid is them thermochemically transformed in accordance with the following reaction:

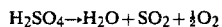
$$H_2SO_4 \rightarrow H_2O + SO_2 + \tfrac{1}{2}O_2$$

This process has been found to be advantageous because of its relatively low energy requirements although considerable energy must be expended nevertheless for the vaporization of the water used in the process. In addition it has been found that considerable effort is required to recover the oxygen with high purity from the resulting $SO_2/O_2$ mixture.

It is also known to produce hydrogen and oxygen by the electrolytic dissociation technique in which hydrogen is withdrawn form the electrolytic solution under the applied voltage by absorbtion in the cathode. At the anode oxygen is released. Such systems are described, for example, in U.S. Pat. No. 3,874,928 and the German patent document (open application-Offenlegungsschrift) No. 2,003,749.

A reversal of this process is also used for generating electricity and it is also known to provide a cathode with a high surface concentration of hydrogen for the production of gaseous hydrogen. The materials used for the cathode are those like palladium or iron alloys which have a high reversible hydrogen diffusion rate. This process cannot be utilized to obtain efficiently molecular hydrogen as is required when the latter is to be used as an energy carrier. An improved process for providing an efficient, relatively simple and economical method of producing molecular hydrogen and oxygen in the form of gaseous oxygen or oxidized substances has been disclosed in our aforementioned copending application Ser. No. 012,746, now U.S. Pat. No. 4,235,863.

OBJECTS OF THE INVENTION

An object of this invention is to provide a system with high energy economy for producing molecular hydrogen.

Another object of the invention is to provide an improved electrolysis cell or apparatus including an electrolysis cell for carrying out an improved method of producing hydrogen.

SUMMARY OF THE INVENTION

The above objects are attained, in a system utilizing an apparatus of the present invention to produce hydrogen and oxygen or an oxide, usually an aqueous system or a system having an aqueous component, which makes use of an electrolysis cell having a cathode compartment and an anode compartment separated by a membrane permeable to hydrogen.

According to the invention, a liquid alkaline metal is introduced into the cathode compartment to form at least in part the cathode (generally with the membrane) while the applied voltage is less than 1.6 volts and the current density is about 2000 A/m² or more, the hydrogen diffusing from the anode compartment forming the corresponding alkali-metal hydride in the cathode compartment.

According to an essential feature of the invention, the alkaline metal is continuously introduced into the cathode compartment while alkali-metal hydride is continuously removed therefrom.

According to the invention, the alkali-metal hydride is then heated to a temperature above its melting point and to a temperature which will result in thermal decomposition of the alkali-metal hydride at least in large measure to produce molecular hydrogen.

According to the invention, the thermal decomposition of the alkali-metal hydride may be carried out continuously as well.

Water in the electrolyte, according to the invention is disassociated and the hydrogen ions or hydronium ions migrate to the membrane where the hydrogen ions are converted at the cathode by discharge to hydrogen and diffused through the membrane to react with the alkali metal and form the corresponding metal hydride.

According to the invention, the alkali-metal hydride can be separated from the molten (liquid) alkali metal and subjected free from significant quantities of the liquid alkaline metal, to a thermal treatment whereby the alkali metal resulting from this thermal treatment is returned to the electrolysis cell while hydrogen is recovered.

In the anode compartment, gaseous oxygen is released directly although, if desired, an oxidation process can be effected in the electrolyte from which oxygen can be recovered subsequently by a thermochemical process in which case the oxidized compound, after release of the oxygen, can be returned to the anode compartment as well. In this case, gaseous oxygen is not generated directly in the anode compartment.

The chemical reaction in the anode compartment has the advantage that it further reduces the cell voltage.

Thus ultimately in accordance with the invention, molecular hydrogen and molecular oxygen can be recovered as products while all other materials processed in the reaction can be returned to the respective cell compartments. All other substances are thus recycled.

According to a feature of the invention, the membrane can fulfill at least in part the function of the cathode provided that it is a material of high electrical conductivity. When the membrane is, as is usually the case in accordance with this invention, a thin foil or film of a metal, it has been found that the electrode is customarily formed by this film in addition to the liquid alkali metal in contact therewith or in proximity thereto.

As cathodic hydrogen acceptors, we prefer to use hydride formers which have as high as possible an affinity to hydrogen. This enables the overall cell voltage to be held as low as possible.

Best results are obtained with hydride-forming alkali metals, namely, molten lithium and molten sodium. In the preferred mode or best mode of carrying out the invention in practice, molten lithium is employed.

We have found that this hydride former is preferable to others because the lithium hydride which is formed during reaction is only soluble to a slight degree in liquid lithium and thus can be separated from the liquid lithium by simple procedures.

A further advantage is that the heat which is picked up by the molten hydride is utilized or recovered in the thermochemical hydrogen-splitting reaction by reducing the heat which must be employed therefor.

Because of its extremely high affinity for hydrogen, the use of lithium allows the hydrogen concentration in the membrane to be relatively low. For this reason as well, by comparison to conventional processes, the voltage required to operate the electrolysis cell is held to a minimum.

In this connection it should be noted that the reduced hydrogen concentration in the membrane material allows membrane materials which undergo nonreversible reactions with hydrogen or which must have hydrogen concentrations of more than 1 to 7% by weight to be avoided.

It has been found to be advantageous to use as the electrolyte in the system of the present invention, an aqueous solution of alkali-metal hydroxides or, even more preferably, a eutectic mixture of sodium hydroxide and potassium hydroxide with a small amount of water. An alternative to the latter preferred electrolyte system is an electrolyte system which consists of sulfuric acid containing some water.

Especially advantageous results are obtained when the electrolyte is constituted of highly concentrated sulfuric acid or a fused eutectic mixture of potassium and sodium hydroxides with a reduced water content. In these cases, the process can be carried out at a temperature between 200° and 400° C., preferably about 300° C. An increase in the efficiency of the process is obtainable by maintaining the electrolyte under a pressure of up to 60 bar and advantageously in excess of 1 bar.

It is possible to operate the apparatus of the present invention so that the interfaces are electrically overloaded, i.e. discharges or resistance heating occurs. This permits the electrolysis to be effected exothermically over all with the heat generated in the process being utilized for steam generation under pressure. The steam which is thus produced can be converted again to electricity with considerable energy recovery.

The apparatus of the present invention can also operate advantageously at elevated temperatures as indicated inasmuch as under these conditions, the electrical overloading takes place to a lesser extent, because of the increased absorption, diffusion and desorption rates of the hydrogen, than when the electrolysis is carried out at temperatures up to 100° C.

With a temperature of about 300° C. with oxygen formation at the anode and with the aid of a hydrated melt of potassium hydroxide and sodium hydroxide (eutectic) or with concentrated sulfuric acid as the electrolyte, it has been found to be advantageous to maintain the cell voltage at about 0.85 to 1.15 volts with the current density measured over the membrane cross section at about 2000 A/m$^2$ or more.

The apparatus of the present invention gives rise to numerous advantages. For example, its operation does not require any separation of gases so that the expense hitherto associated with such gas separation and the equipment required for it are completely eliminated.

About 50% of the minimum necessary reversible energy required for water splitting is directly coupled to the circulation of the lithium because of its transport via the endothermic reaction.

Where thermal energy is required to maintain the reaction, it can be obtained at least in part from the cooling circulation of a high temperature nuclear reactor by, for example, utilizing helium heated therein in the decomposition of the lithium hydride, e.g. as a blanketing gas, or by passing the circulated lithium through a portion of the cooling circuit of the high temperature nuclear reactor or by passing the lithium hydride melt through a portion of this circulation. This poses no problem since lithium, lithium hydride and helium have all been utilized in the cooling circuits of high temperature nuclear reactors or can be used therein in the same way that other alkali metals are employed.

In this connection it may be noted that the materials for the coolant systems of high temperature nuclear reactors are especially designed for use with alkali metals in a liquid state and hence the utilization of the high temperature nuclear reactor cooling system to heat the electrolysis system of the present invention poses no problems with respect to the materials from which the cooling system is constructed.

Especially low cell voltages can be obtained when oxygen is not intended to be generated directly at the anode but a chemical oxidation is carried out in the anode compartment in the electrolyte therein. For this purpose, chemical compounds can be incorporated in the electrolyte and these can be oxidized with production of oxygen subsequently by a further endothermic step externally of the electrolysis cell.

For example, with electrolysis temperatures of up to 200° C., sulfur dioxide can be incorporated in an electrolyte consisting of dilute sulfuric acid which can contain 45 to 70% by weight H$_2$SO$_4$, the following reactions being effected:

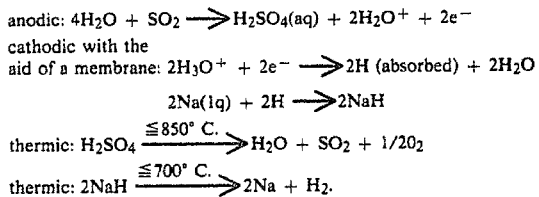

An alternative process uses a hydrogen chloride/chlorine/hydrogen system in which hydrogen chloride in aqueous solution is oxidized to chlorine. This can be effected with the following cyclical process:

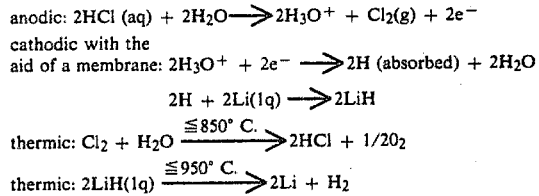

It will be understood that other oxidized compounds, usually oxides, which can be thermally decomposed to yield oxygen can be formed in the electrolysis cell. Furthermore, the oxidized products need not be thermally decomposed to oxygen but may be utilized as such if they themselves are valuable or economical products.

Instead of molten or liquid alkali metals in the cathode compartments of the electrolysis cell, it is also possible, although it is not preferred, to employ a solution of alkali metals or alkaline-earth metals in, for example, a fused-salt system. In this case, the cathodes described will not always be suitable and the cathode may have to be modified to resist corrosion by the molten salt solvent.

The preferred membranes for use with the present invention, can be palladium which can be coated with iron on its surface turned toward the alakli metal. Other materials have been found to be effective as the membrane or cathode of the invention. For example, a particularly satisfactory membrane can be constituted of zirconium, iron/titanium alloys, iron/tantalum alloys and iron/niobium alloys or combinations thereof with nickel, copper or silver.

However, it has been found to be possible to utilize practically all materials which have a high reversible hydrogen diffusion rate. Such membranes can also be hydrides of the type described by van Rijswick, "Metal Hydride Electrodes for Electrochemical Energy Storage," International Symposium on Hydrides for Energy Storage in Geilo, Norway, August 1977. These substances can be used as cathode materials.

The material which is utilized as the anode can be any material resistant to the electrolyte and thus will depend thereon. No problem has been found with platinum in this connection.

BRIEF DESCRIPTION OF THE DRAWING

The above and other objects, features and advantages of the present invention will become more readily apparent from the following description, reference being made to the sole FIGURE of the accompanying drawing which illustrates purely diagrammatically an apparatus including an electrolysis cell according to the present invention.

SPECIFIC DESCRIPTION

The diagrammatically illustrated electrolysis cell of the drawing comprises a hermetically sealed pressure-retentive housing 10 which is formed into an anode compartment 11 and a cathode compartment 12 by a membrane 16 which is permeable to hydrogen and also serves at least in part as the cathode, being connected to the negative terminal of a direct-current source 20 capable of delivering a voltage less than 1.6 volts and preferably between 1.0 and 1.1 volts dc in the case of sodium, forming the cathodic liquid alkaline metal.

The anode compartment can be provided with an electrode (anode) 17 which is inert to the electrolyte here shown to be a fused hydroxide eutectic of potassium hydroxide and sodium hydroxide containing some water.

Water can be fed into this system by a pump 30 and a line 31. Naturally, the amount of water introduced into this system should be equal to the amount of hydrogen and oxygen obtained.

The electrolysis cell is shown to be formed with a heater 18 to maintain it at its operating temperature of about 300° C. although it should be understood that the heat required for operating this cell may be obtained from a high temperature nuclear reactor 26 through which the lithium and any residual lithium hydride can be circulated as part of the cooling system of this nuclear reactor. In addition, hydrogen which may be used to blanket the reactor 23 for the thermal decomposition of the lithium hydride may be passed through the high temperature gas-cooled nuclear reactor 26.

The membrane illustrated in the drawing can be a palladium foil coated with iron on the side facing the liquid lithium and may require support between a pair of fritted nickel plates 14, 15 highly permeable to the electrolyte, the molten lithium and to hydrogen. The assembly 14–16 is represented as the cathode/membrane 13 in the drawing.

As can be seen from the drawing, moreover, a pump 21 continuously circulates molten lithium into the cathode compartment 12 while a suspension of lithium hydride in molten lithium passes off at the top of the cathode compartment into a lithium hydride separator 22 from which the lithium hydride settles out and is fed to the hydrogen splitter 23. The decanted molten lithium from the separator 22 is returned to the intake of the pump 21 and is recycled thereby to the cathode compartment 12.

In the hydrogen splitter 23, the lithium hydride is first melted and then heated to a temperature sufficient to thermally decompose it, the hydrogen being recovered at 24.

The anode compartment may be maintained at a superatmospheric pressure up to and preferably close to 60 bar, the gas space 19 being maintained with a water vapor pressure sufficient to ensure that the electrolyte will contain sufficient water for electrolytic decomposition. The gaseous oxygen from the anode compartment is recovered at 25 if the electrolyte does not contain a compound capable of oxidation and subsequent thermal decomposition to oxygen or a compound which is to be converted into a recoverable oxide.

The system illustrated in the drawing can be operated as described in Example I below.

SPECIFIC EXAMPLES

Example I

In the cathode compartment of an electrolysis cell, e.g. that of the drawing, lithium is introduced in a molten state. The electrolyte is a eutectic mixture of potassium hydroxide and sodium hydroxide which is maintained under a vapor pressure of 1 bar water vapor in the form of steam. The electrolysis is carried out at a temperature of about 380° C. with an applied voltage between about 0.9 and 1.1 volts. The current density is slightly above 2000 A/m$^2$ measured over the surface of the membrane.

The membrane is a 10$^{-2}$ mm thick palladium foil on whose surface facing the lithium melt a coating of 10$^{-3}$ mm thick iron is applied by vapor deposition to resist corrosion from the molten lithium.

The membrane can be activated, if desired, with palladium mohr.

To increase its mechanical stability, the membrane is sandwiched between two highly porous fritted nickel support plates. The membrane serves simultaneously as the cathode. The anode is a platinum sheet although nickel can also be used without modifying the parameters.

During the operation of the electrolysis cell, lithium hydride is formed in solid state in the molten lithium. The lithium hydride is recovered, melted at about 690° C. and is then decomposed in a helium atmosphere (current) at about 850° C. under a pressure of about 1 bar. The hydrogen is recovered and the lithium is recycled. About 5 to 10% by weight of the lithium hydride is not thermally decomposed and is recycled with the molten lithium to the cell.

It was found that similar current densities can be maintained with a foil of iron/titanium nickel alloy at a thickness of 10$^{-2}$ mm.

EXAMPLE II

Somewhat better results were obtained with the use of an iron/niobium alloy containing about 30% by weight niobium and some copper as the membrane. Here again the membrane was used simultaneously as the cathode and a layer of palladium (10$^{-3}$ mm in thickness) was vapor deposited thereon.

When sodium was substituted as the hydride former in the system of Example I for the lithium, the temperature could be about 250° C. using a voltage of 1.0 to 1.6 volt. The resulting sodium hydride was decomposed at a temperature above 430° C. into liquid sodium and hydrogen.

We claim:

1. An apparatus for the production of hydrogen and oxygen or an oxidized compound, comprising:
   an electrolysis cell subdivided by a membrane into an anode compartment and a cathode compartment, said membrane being permeable to hydrogen exclusively by absorption at said anode compartment and diffusion through the membrane, said anode compartment adapted to contain an electrolyte electrolytically disassociatable to produce hydrogen;
   means for electrolyzing said electrolyte between an anode in said anode compartment and a cathode at said cathode compartment to disassociate a substance in said electrolyte and produce hydrogen which diffuses through said membrane to said cathode compartment;
   means for continuously feeding a molten hydride-forming metal into said cathode compartment whereby said metal reacts with hydrogen and forms the corresponding hydride;
   means external of said cathode compartment for thermally decomposing the metal hydride and generating hydrogen; and
   means for recycling metal formed by thermal decomposition of the metal hydride to the cathode compartment.

2. The apparatus defined in claim 1 wherein said membrane is selected from the group which consists of:
   a layer of palladium coated with iron on its side turned toward the liquid metal;
   a layer of zirconium;
   a layer of iron/titanium alloy;
   a layer of iron/tantalum alloy; and
   a layer of iron/niobium alloy.

3. The apparatus defined in claim 2, further comprising means for heating said cell at least in part by the cooling of a high temperature nuclear reactor.

4. The apparatus defined in claim 2, further comprising means for recovering molecular oxygen from said anode compartment.

5. An electrolysis cell for utilization in the apparatus of claim 1 wherein said membrane is selected from the group which consists of:
   a layer of zirconium;
   a layer of iron/titanium alloy;
   a layer of iron/tantalum alloy; and
   a layer of iron/niobium alloy.

* * * * *